US009481423B2

(12) United States Patent
Chen

(10) Patent No.: US 9,481,423 B2
(45) Date of Patent: Nov. 1, 2016

(54) SINGLE-WHEEL STRUCTURE TRANSPORTATION DEVICE WITH EXTENDABLE WALKING HANDLE

(71) Applicant: Shane Chen, Camas, WA (US)

(72) Inventor: Shane Chen, Camas, WA (US)

( * ) Notice: Subject to any disclaimer, the term of this patent is extended or adjusted under 35 U.S.C. 154(b) by 0 days.

(21) Appl. No.: 14/565,400

(22) Filed: Dec. 9, 2014

(65) Prior Publication Data

US 2016/0159424 A1 Jun. 9, 2016

(51) Int. Cl.
*B62K 1/00* (2006.01)
*B62K 15/00* (2006.01)
*B62K 3/00* (2006.01)

(52) U.S. Cl.
CPC ............... *B62K 1/00* (2013.01); *B62K 3/007* (2013.01); *B62K 15/006* (2013.01)

(58) Field of Classification Search
CPC ....... B62K 1/00; B62K 3/007; B62K 15/006
See application file for complete search history.

(56) References Cited

U.S. PATENT DOCUMENTS

| 6,561,294 | B1 * | 5/2003 | Kamen et al. | 180/21 |
| 7,543,834 | B2 * | 6/2009 | Goczey et al. | 280/205 |
| 8,522,902 | B2 * | 9/2013 | Gomi et al. | 180/21 |
| 8,800,697 | B2 * | 8/2014 | Hoffmann et al. | 180/21 |
| 8,807,250 | B2 * | 8/2014 | Chen | B62K 1/00 180/21 |
| 9,085,334 | B2 * | 7/2015 | Hoffmann et al. | |
| 2006/0279057 | A1 * | 12/2006 | Shimizu et al. | 280/205 |
| 2008/0143073 | A1 | 6/2008 | Ungar | |
| 2008/0147281 | A1 | 6/2008 | Ishii | |
| 2009/0032323 | A1 | 2/2009 | Kakinuma | |
| 2009/0266629 | A1 * | 10/2009 | Simeray | B62K 1/00 180/65.51 |
| 2011/0056757 | A1 * | 3/2011 | Polutnik | 180/65.51 |
| 2013/0228385 | A1 | 9/2013 | Chen | |

* cited by examiner

*Primary Examiner* — Faye M Fleming

(57) ABSTRACT

A single-wheel structure transportation device with an extendable walking handle. The transportation device may include a motor, gyroscopic fore-aft self-balancing, and foot platforms for riding the device in a substantially standing position. Various extendable handle arrangements are disclosed that permit a use to readily maneuver the device while walking and to stow the walking handle with or within the frame or housing of the device while the user is riding the device.

20 Claims, 5 Drawing Sheets

SINGLE-WHEEL STRUCTURE TRANSPORTATION DEVICE WITH EXTENDABLE WALKING HANDLE

CROSS REFERENCE TO RELATED APPLICATIONS

This application claims the benefit of earlier filed U.S. Provisional Patent Application No. 61/913,873, filed Dec. 9, 2013, in the name of the above-identified inventor.

FIELD OF THE INVENTION

The present invention relates to portable, motorized single wheel (or single wheel-structure) personal transportation devices and, more specifically, to such devices with an extendable walking handle that permits a user to readily push or pull the device while walking.

BACKGROUND OF THE INVENTION

Prior art devices include the "Segwey" (disclosed in U.S. Pat. No. 6,302,230 issued to Kamen et al.), a two wheeled fore-aft self-balancing personal transportation device. The fore-aft self-balancing is achieved through gyroscopic sensors and motors that drive the wheels forward or backward in a self-leveling manner.

One or "single" wheel fore-aft self-balancing devices are also known in the art. They use similar gyroscopic sensors and motor(s) for fore-aft self-balancing, yet rely on the user (and vehicle momentum) for side to side balance. Single wheel devices include those of Chen (U.S. Pat. No. 8,807,250, issued Aug. 19, 2014, for a Powered Single-Wheeled Self-Balancing Vehicle for Standing User), Simeray (U.S. Pat. No. 8,616,313, issued Dec. 31, 2013, for a Motorized Transport Vehicle for a Pedestrian) and others including Kamen et al. The single-wheel devices may have a seat—similar to a conventional, non-motorized unicycle—or a raised, fixed control handle (Kamen et al.), or be seatless and lacking a fixed control handle as disclosed by Chen and Simeray. When the seated or control handle devices are moved from one "user area" to another, they may be pulled or pushed by their seat or control handle, respectively. The seatless and no control handle devices of Chen and Simeray are intended to be carried by a user between use areas (for example, carried through crowded sidewalks or in malls or stores, etc.). The seated or fixed control handle devices are bulky and restrict rider movement. The devices of Chen and Simeray can be disadvantageously heavy with the weight of their batteries, motor, and wheel components, etc., and are impractical for being carried longer distances or by someone with limited upper body strength.

Thus, a need exists to comfortably and non-awkwardly move the low-profile (non-seat, non-fixed control handle) devices between use areas. A need further exists for a kick stand or the like to readily "park" the devices in a substantially upright position between uses, particularly, for example, when a user is out-and-about town.

SUMMARY OF THE INVENTION

Accordingly, it is an object of the present invention to single wheel structure transportation device with an extendable walking handle.

This and related objects of the present invention are achieved by use of a single wheel structure transportation device or vehicle as described and recited herein.

The attainment of the foregoing and related advantages and features of the invention should be more readily apparent to those skilled in the art, after review of the following more detailed description of the invention taken together with the drawings.

DETAILED DESCRIPTION

Figure 1:
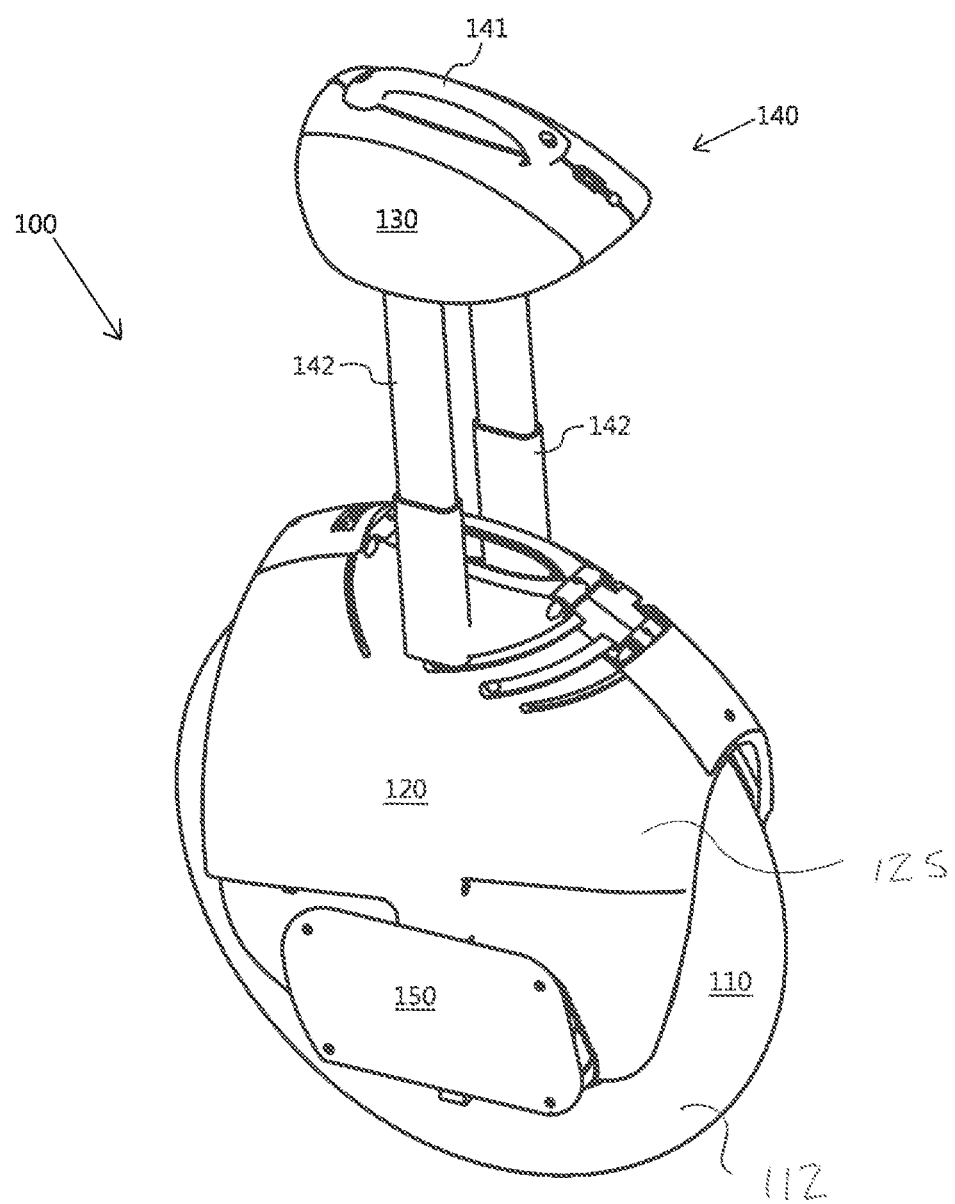
FIG. 1 is a perspective view of one embodiment of a single-wheel transportation vehicle or device with an extendable walking handle in accordance with the present invention.

Referring to FIG. 1, a perspective view of one embodiment of a single-wheel transportation vehicle or device 100 with an extendable walking handle 140 in accordance with the present invention is shown. Device 100 may include a wheel 110 that is rotatably coupled to a frame 120, user pedals 150 coupled to frame 120 (they are shown in the folded closed position in FIG. 1), and a top structure or piece 140 positioned near the top of frame 120. Wheel 110 may include a wheel rim 111 and one or more tires 112.

Frame 120 may include a substantially rigid structure that holds wheel 110 in place and provides points of attachment for pedals 150 and top piece 140. Frame 120 may have an external housing 125 that preferably encloses and supports the motor(s), power source(s), circuit boards, and other operational components (known in the art) that are mounted to the frame. The housing 125 is preferably a case or shell which covers portions of wheel 110 in order to prevent unintentional contact with the user's body or clothing while riding, and protects components within from environmental fouling. In the embodiment of FIG. 1, housing 125 mainly covers the top of the wheel and leaves most of the front and back exposed, but a variety of other sizes and shapes are possible, covering a greater or lesser area of the wheel without departing from the present invention.

The two pedals 150 are respectively disposed on the left and right sides of frame 120 (only the left pedal is visible in this figure). Pedals 150 may be pivotably coupled to frame 120 so as to be convertible between an open, unfolded position for riding (substantially flat along the top surface), and a closed, folded position when not in use. The closed position is shown in FIGS. 1-2 (and other figures herein).

The top piece or structure 140 may have a handle 141 and leg contacting surfaces 130 formed on the left and right sides. Top piece 140 is coupled to the upper ends of two extendable members 142 that are preferably substantially rigid bars or rods (i.e., shafts) oriented in a generally vertical direction (when device 100 is upright). The lower ends of extendable members 142 are coupled to frame 120 such that they are respectively disposed on the left and right sides of wheel 110. In this embodiment, each of extendable members 142 may be made of two or more slidable sections that are nested so as to extend and retract telescopically. In FIG. 1, extendable members 142 are shown in their extended state. Other configurations of extendable members are possible, such as one in which each extendable member is made of a single piece of material that can slide upward and downward relative to frame 120.

Leg contacting surfaces 130 may be disposed on the left and right sides of top piece 140, and may either be separate components coupled to top piece 140, or may be formed integrally with top piece 140, or otherwise molded into or provided with housing 125. When top structure 140 is raised above the device and the extension members 142 are fully (or near fully) extended (as in FIG. 1), the user can grip the handle and push or pull the vehicle while walking. In this manner, the raised handle 141 allows the user to easily maneuver the device while walking next to it. Extendable members 142 can be releasably locked in this raised, extended state, and is preferably lockable at different heights. The motor and self-balancing functions may be either on or off while the device is walked.

Figure 2:
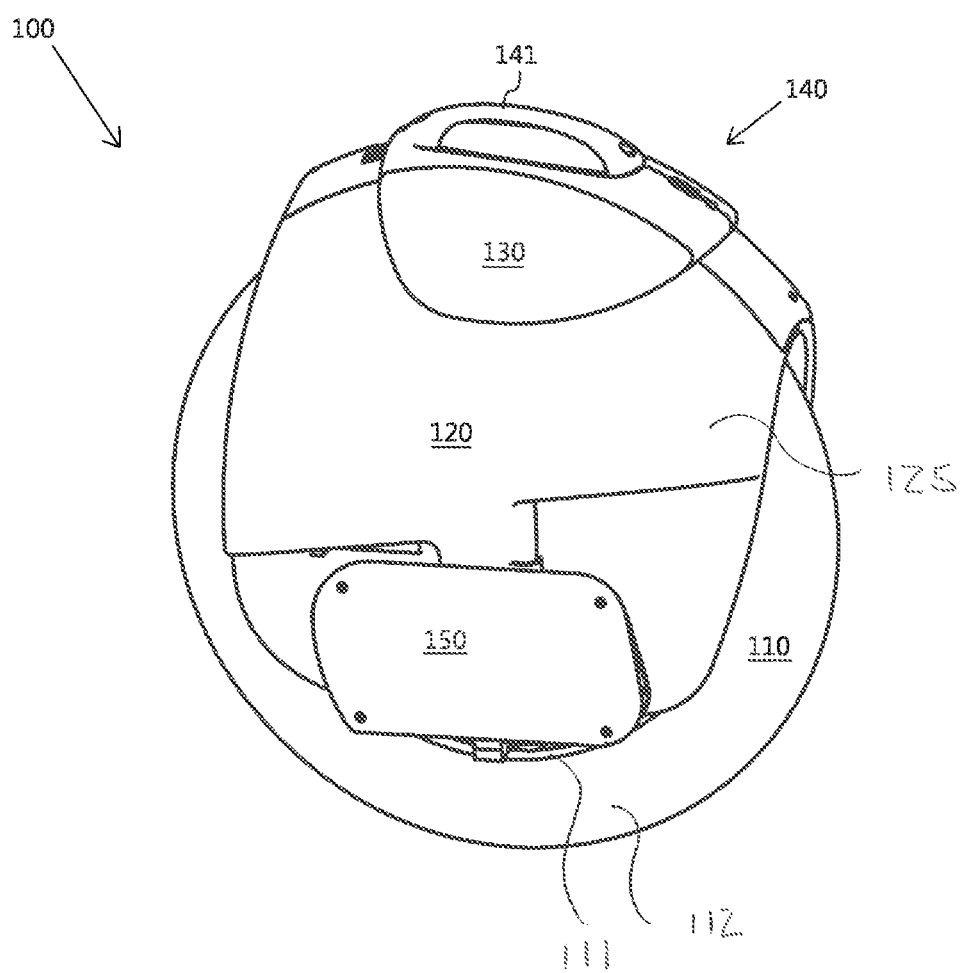
FIG. 2 is a perspective view of the device of FIG. 1 with extendable members 142 fully retracted and the top piece resting atop the frame.

Referring to FIG. 2, a perspective view of device 100 is shown with extendable members 142 fully retracted and top piece 140 resting atop frame 120. The top piece 140 may be substantially flush with housing (or the remainder of housing) 125. In the retracted position, leg contacting surfaces 130 are positioned for ready contact by the inward sides of the user's lower legs while the user stands on pedals 150 (as disclosed in Chen U.S. Pat. No. 8,807,250), thus aiding in lateral stabilization of the vehicle and support of the user's ankles, among other benefits. Extendable members 142 and top piece 140 can be releasably locked in this lowered, retracted state, so that handle 141 can be used to lift, carry or hang/store device 100. Although, in the embodiment of FIGS. 1-2, leg contacting surfaces 130 are provided on top piece 140, in other embodiments the leg contacting surfaces may be coupled to or formed as part of frame 120, separate in whole or in part from top portion 140.

Figure 3:
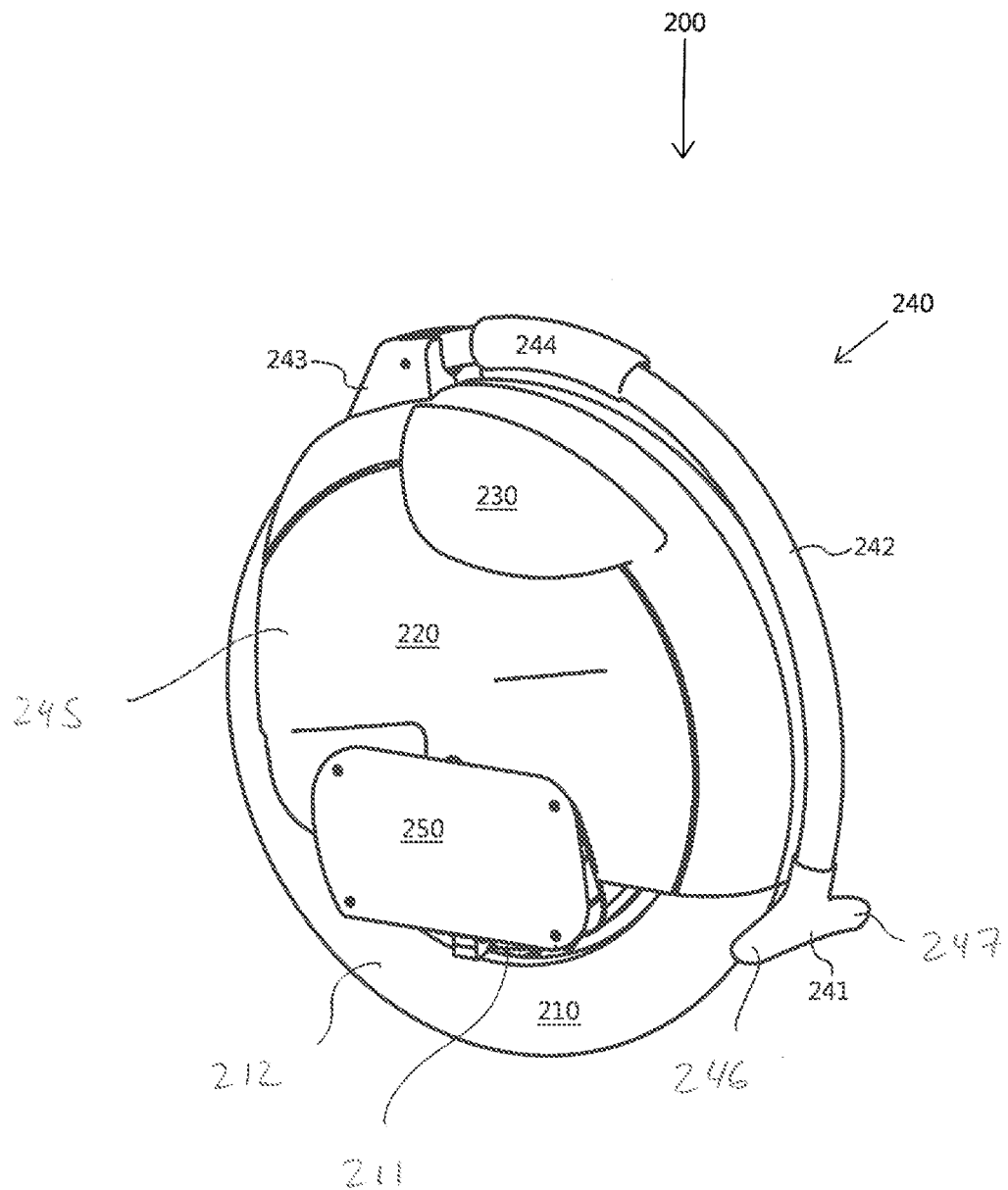
FIG. 3 is a perspective view of another embodiment of a single wheel transportation device or vehicle with an extendable walking handle in accordance with the present invention.

Referring to FIG. 3, a perspective view of another embodiment of a single wheel transportation device or vehicle 200 with an extendable walking handle in accordance with the present invention is shown. Device 200 may have a wheel 210, frame 220, leg contact surfaces 230, and pedals 250, similar to their counterparts in device 100 of FIGS. 1 and 2. Instead of a vertically telescoping top piece, however, device 200 has a curved handle assembly 240 coupled to frame 220 which is movable between a collapsed and an extended position.

Handle assembly 240 may include an anchoring or mounting structure 243 coupled to or formed integrally with frame 220, an elongated curved member 242, and a handle 241. The curved member or shaft 242 is preferably pivotably coupled on one end to anchoring structure 243. The handle 241 is preferably provided on the other end. A grip member or area 244 may be positioned on curved member 242 between the two ends, and more preferably closer to the place of movable or pivotable coupling. The coupling between curved member 242 and anchoring structure 243 may be a single-axis pivot joint which allows handle assembly 240 to move between an "open" position (FIG. 4) and a "closed" position (FIG. 3), though other joint structures or configurations may be used without departing from the present invention. As shown in FIG. 3, curved member 242 preferably approximates the contour of frame 220 and/or wheel 210.

With handle assembly 240 in the closed position, device 200 may be positioned, i.e., rocked back, so that handle 241 contacts the ground. Handle 241 preferably extends perpendicularly (laterally) from the central plane of wheel 210 (handle ends 246,247) to afford lateral stability and effectively function as a kick stand, maintaining the vehicle upright in a "parked" position.

Grip member 244 may be a sleeve of width comparable to that of a user's hand, wrapped around curved member 242 and located generally at the top of the vehicle (as shown in FIG. 3). The user can use grip member 244 as a secure and comfortable carrying handle for lifting the vehicle and, accordingly, grip area 244 may be made of material and/or shaped to be comfortable for the user's hand. Grip member or area 244 may be otherwise arranged including forming a grip area integrally in curved member 242.

Figure 4:
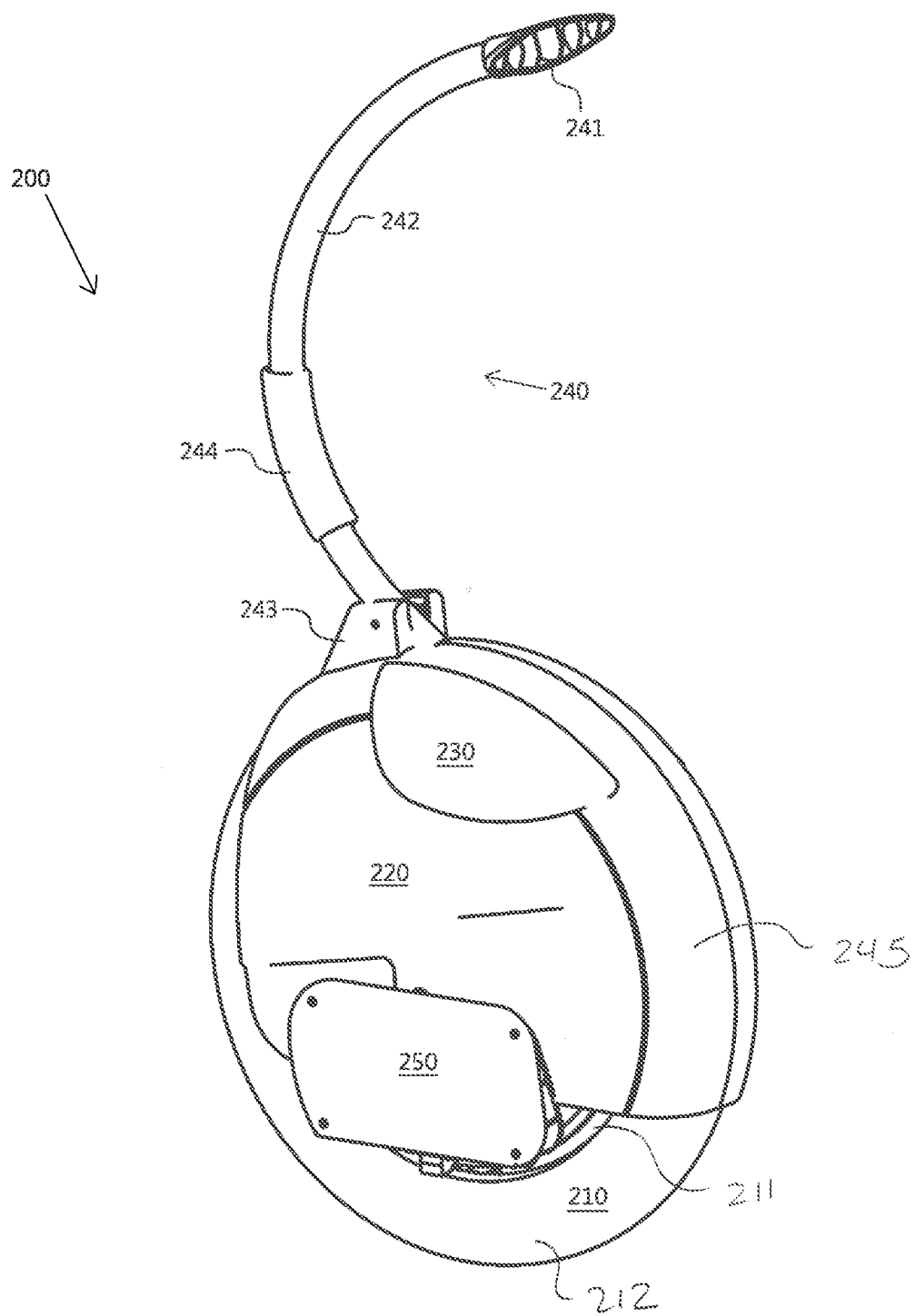
FIG. 4 is a perspective view of the device of FIG. 3 with walking handle assembly in the open or walking position.

Referring to FIG. 4, a perspective view of device 200 of FIG. 3 with handle assembly 240 in the open or walking position is shown. The user can grip handle 241 with one or both hands and push or pull the vehicle while walking, with the motor and self-balancing functions either on or off. As with device 100, the raised handle allows the user to easily maneuver the device when not riding it. Curved member 242 can be releasably locked in the raised position, and could be configured to be lockable at other points along its range of motion.

Figure 5:
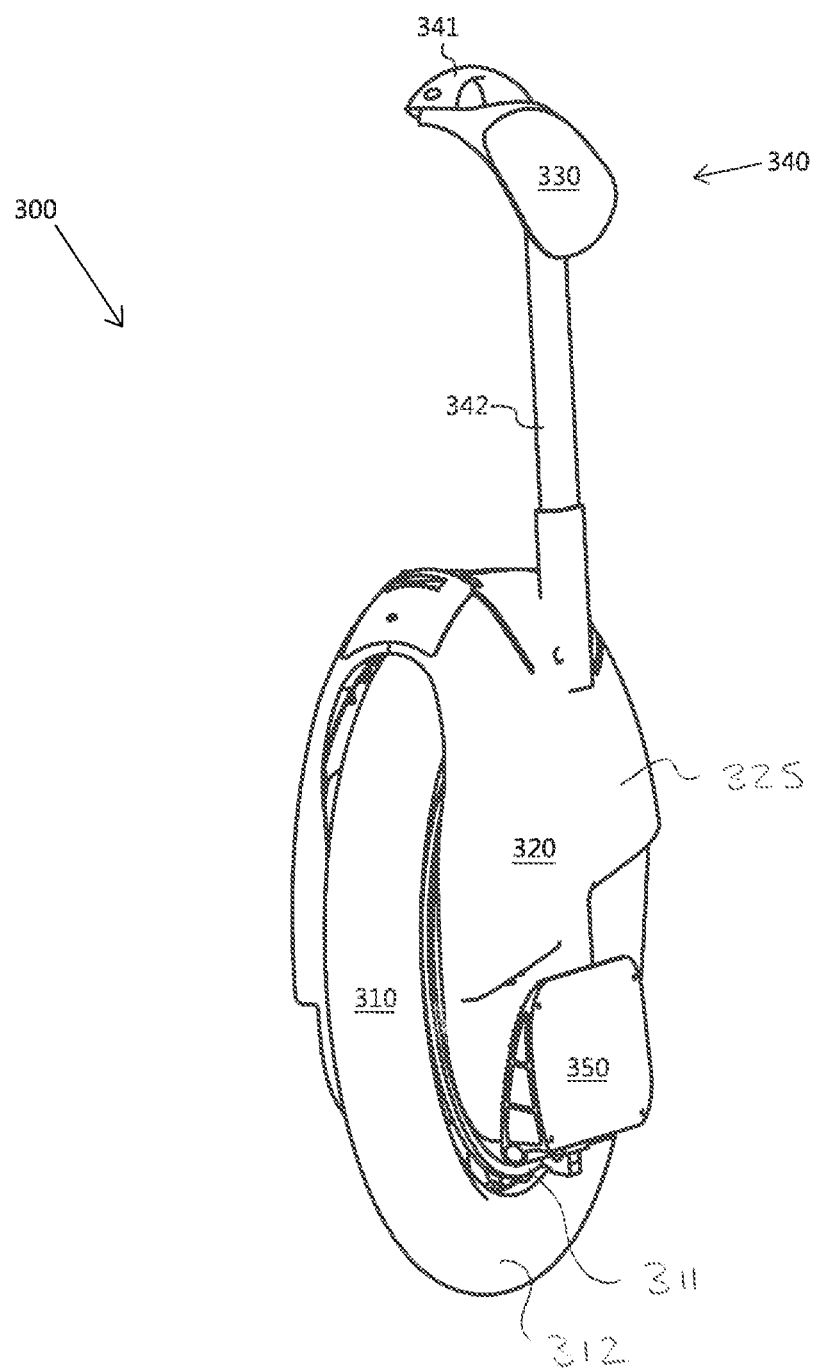
FIG. 5 is a perspective view of another embodiment of a single wheel transportation device or vehicle with an extendable walking handle in accordance with the present invention.

Referring to FIG. 5, a perspective view of another embodiment of a single wheel transportation device or vehicle 300 with an extendable walking handle in accordance with the present invention is shown.

Device 300 may be similar to device 100 of FIGS. 1 and 2, having a wheel 310, a frame 320, pedals 350, and a top piece 340 that includes a leg contacting surface 330 and a handle 341.

In contrast to device 100 of FIGS. 1-2, which had two extendable members, device 300 as shown in FIG. 5 has one extendable member 342 (though note that an extendable member may have multiple parts). Member 342 may be disposed on one side of the vehicle (in this case the left side) and may move/telescope into and out of frame 320. The location of extendable member 342 on one side (or the other) of wheel 310 allows the member to retract into frame 320 with handle 341 remaining centered more or less in the central vertical plane of the wheel. From this position, a user may readily apply a substantially symmetrical force to device 300 to maneuver it while walking.

While a single wheel rim and tire are shown in each of the embodiments, the wheel rim may be expansive enough for two or more tires or two wheel rims may be presented with one or more tires each, the two wheel rims drive in a similar manner to approximate a very large or broad wheel. This "broader" structure is referred to herein as a single-wheel structure.

It can be seen in many of the figures that the extended handle 141, 241, 341, extends above the wheel by a length of at least one "radius" and may extend by a distance or two, three or more radiuses above the wheel. It may also extend less than one radius, particularly when the wheel is large.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A fore-aft self-balancing transportation device with an extendable walking handle, comprising:
    a single wheel structure having a wheel rotatably coupled to a seatless frame;
    a motor for driving the wheel;
    a fore-aft balance control system that controls the motor;
    a first foot platform and a second foot platform located on opposite sides of the wheel and coupled to the frame;
    a first and a second lower leg contact surface provided on opposite sides of the wheel and positioned above the first and second foot platform, respectively; and
    an extendable walking handle mechanism, including a handle and a shaft, that is coupled to the frame and capable of movement between a retracted in-use position and an extended walking position.

2. The device of claim 1, wherein the shaft telescopes into the frame in moving from the extended position to the retracted position.

3. The device of claim 1, wherein the height to which the handle extends in the extended position is adjustable.

4. The device of claim 1, wherein the wheel defines a radius and the handle moves, between the retracted position and the extended position, a distance that is equal to or greater than the radius of the wheel.

5. The device of claim 4, wherein, in the extended walking position, the handle extends above the wheel a distance equal to or greater than twice the radius of the wheel.

6. The device of claim 1, further comprising a kickstand.

7. The device of claim 1, wherein the extendable walking handle is coupled to the frame between and above the lower leg contact surfaces.

8. The device of claim 1, wherein at least one of the leg contact surfaces is coupled to the handle in such a manner as to extend upwardly with the handle when the handle is moved to the extended position.

9. The device of claim 1, wherein the shaft is curved and pivotably coupled to the frame.

10. The device of claim 9, wherein the handle is located at an end of the shaft and a carrying grip is coupled to the shaft closer to the pivotal coupling.

11. A fore-aft self-balancing transportation device with an extendable handle, comprising:
    a single wheel structure having a wheel rotatably coupled to a frame, the wheel defining a radius;
    a motor for driving the wheel;
    a fore-aft balance control system that controls the motor;
    a first foot platform and a second foot platform located on opposite side of the wheel and coupled to the frame;
    an extendable walking handle mechanism, including a handle and a shaft, that is coupled to the frame and capable of movement between a retracted in-use position and an extended walking position;
    wherein the handle moves, between the retracted position and the extended position, a distance that is equal to or greater than the radius of the wheel.

12. The device of claim 11, wherein, in the extended walking position, the handle extends above the wheel a distance equal to or greater than twice the radius of the wheel.

13. The device of claim 11, further comprising a first and a second lower leg contacting surface provided on opposite sides of the wheel and positioned above the first and second foot platform, respectively.

14. The device of claim 11, wherein the shaft of the extendable walking handle mechanism is at least one of the group of a telescoping shaft and a curved shaft.

15. The device of claim 11, further including a member that protrudes laterally from the center vertical plane of the wheel to maintain the wheel upright when at rest.

16. The device of claim 11, wherein the extent to which the handle extends is adjustable.

17. A fore-aft self-balancing transportation device with an extendable walking handle, comprising:
    a single wheel structure having a wheel rotatably coupled to a frame;
    a motor for driving the wheel;
    a fore-aft balance control system that controls the motor;
    a first foot platform and a second foot platform located on opposite sides of the wheel and coupled to the frame; and
    an extendable walking handle mechanism, including a handle and a shaft, that is coupled to the frame and configured such that the handle and shaft are capable of movement between a retracted in-use position and an extended walking position.

18. The device of claim 17, wherein the extent to which the handle extends is adjustable.

19. The device of claim 17, further including a member that protrudes laterally from the center vertical plane of the wheel to maintain the wheel upright when at rest.

20. The device of claim 17, wherein the shaft of the extendable walking handle mechanism is at least one of the group of a telescoping shaft and a curved shaft.

* * * * *